US012579127B2

(12) United States Patent
Raz et al.

(10) Patent No.: US 12,579,127 B2
(45) Date of Patent: Mar. 17, 2026

(54) DETECTING LABELS OF A DATA CATALOG INCORRECTLY ASSIGNED TO DATA SET FIELDS

(71) Applicant: International Business Machines Corporation, Armonk, NY (US)

(72) Inventors: Orna Raz, Haifa (IL); Yannick Saillet, Stuttgart (DE); Maya Zohar, Haifa (IL); Marcel Zalmanovici, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/219,664

(22) Filed: Jul. 8, 2023

(65) Prior Publication Data

US 2025/0013629 A1 Jan. 9, 2025

(51) Int. Cl.
*G06F 16/23* (2019.01)
*G06F 16/906* (2019.01)

(52) U.S. Cl.
CPC ........ *G06F 16/2365* (2019.01); *G06F 16/906* (2019.01)

(58) Field of Classification Search
CPC .................................................. G06F 16/2365
See application file for complete search history.

(56) References Cited

U.S. PATENT DOCUMENTS

| 10,235,446 | B2 | | 3/2019 | Schmidtler et al. | |
|---|---|---|---|---|---|
| 11,003,640 | B2 | * | 5/2021 | Goeser | G06F 16/215 |

| 11,327,668 | B1 | * | 5/2022 | Hua | G06F 3/0659 |
|---|---|---|---|---|---|
| 2016/0224659 | A1 | * | 8/2016 | Robichaud | G06F 3/04842 |
| 2018/0032570 | A1 | * | 2/2018 | Miller | G06F 16/2455 |
| 2019/0155802 | A1 | * | 5/2019 | Miller | G06F 3/04842 |
| 2019/0205794 | A1 | * | 7/2019 | Hsu | G06N 20/20 |
| 2019/0251165 | A1 | * | 8/2019 | Bachrach | G06N 3/084 |
| 2021/0027503 | A1 | * | 1/2021 | Kumaresan | G06F 3/04842 |
| 2021/0133622 | A1 | * | 5/2021 | Nidd | G06F 16/258 |
| 2021/0357555 | A1 | * | 11/2021 | Liu | G06F 30/20 |
| 2021/0374164 | A1 | * | 12/2021 | Ghoula | G06F 16/285 |

(Continued)

OTHER PUBLICATIONS

Reiss et al., "Identifying Incorrect Labels in the CoNLL-2003 Corpus," Proceedings of the 24th Conference on Computational Natural Language Learning, Nov. 19, 2020, pp. 215-226.

(Continued)

*Primary Examiner* — Mohammad S Rostami
(74) *Attorney, Agent, or Firm* — Shackelford, McKinley & Norton, LLP; Robert A. Voigt, Jr.

(57) ABSTRACT

Described are techniques for detecting labels incorrectly assigned to data set fields. The data of each data set field, such as those data set fields assigned to the same label, are represented using a set of characteristics. The data set fields are then clustered into clusters based on the characteristics of the data of the data set fields. Those clusters of data set fields with a homogeneity (being assigned the same label) that exceeds a first threshold value and is below a second threshold value are identified. One or labels assigned to the data set fields of the identified clusters are identified as being suspect for incorrect assignments by having a frequency below a third threshold value (e.g., 3%), which may be user-designated. The label(s) identified as being suspect for incorrect assignment are then presented to a user for review.

14 Claims, 6 Drawing Sheets

(56)            References Cited

U.S. PATENT DOCUMENTS

| | | | | |
|---|---|---|---|---|
| 2022/0171749 | A1* | 6/2022 | Le Huerou | G06F 16/285 |
| 2023/0009725 | A1* | 1/2023 | McDaniel | G16C 20/20 |
| 2024/0061871 | A1* | 2/2024 | Amrite | G06F 16/383 |
| 2024/0076744 | A1* | 3/2024 | Blidner | G16B 25/10 |
| 2024/0095394 | A1* | 3/2024 | Madhavan | G06N 20/00 |
| 2024/0177803 | A1* | 5/2024 | Goldberg | G16B 25/10 |
| 2024/0193167 | A1* | 6/2024 | Alexander | G06F 16/24573 |
| 2024/0370433 | A1* | 11/2024 | Kondiles | G06F 16/27 |
| 2024/0394314 | A1* | 11/2024 | Danichev | G06F 16/285 |

OTHER PUBLICATIONS

Chong et al., "Detecting Label Errors by Using Pre-Trained Language Models," Proceedings of the 2022 Conference on Empirical Methods in Natural Language Processing, Dec. 2022, pp. 9074-9091.

Guan et al., "Identifying Mislabeled Training Data with the Aid of Unlabeled Data," Applied Intelligence, vol. 35, 2011, pp. 345-358.
Brodley et al., "Identifying Mislabeled Training Data," Journal of Artificial Intelligence Research, vol. 11, 1999, pp. 131-167.
"Automated Metadata Tagging—Why do data catalogs fail?", DATALOGZ, Jan. 3, 2024, 9 pages, doi: https://www.datalogz.io/post/automated-metadata-tagging-why-do-data-catalogs-fail.
David Thain, "New Informatica Capabilities Clear the Path to Al-Ready Data", Informatica, Oct. 29, 2025, 9 pages, doi: https://www.informatica.com/blogs/new-informatica-capabilities-clear-the-path-to-ai-ready-data.html.
Goncalves et al., "Aligning Biomedical Metadata with Ontologies Using Clustering and Embeddings", Lecture Notes in Computer Science, May 2019, 15 pages, DOI: 10.1007/978-3-030-21348-0_10.
Y. He et al., "Auto-Tag: Tagging-Data-By-Example in Data Lakes", arXiv, Dec. 11, 2021, 10 pages, doi: https://arxiv.org/abs/2112.06049.

* cited by examiner

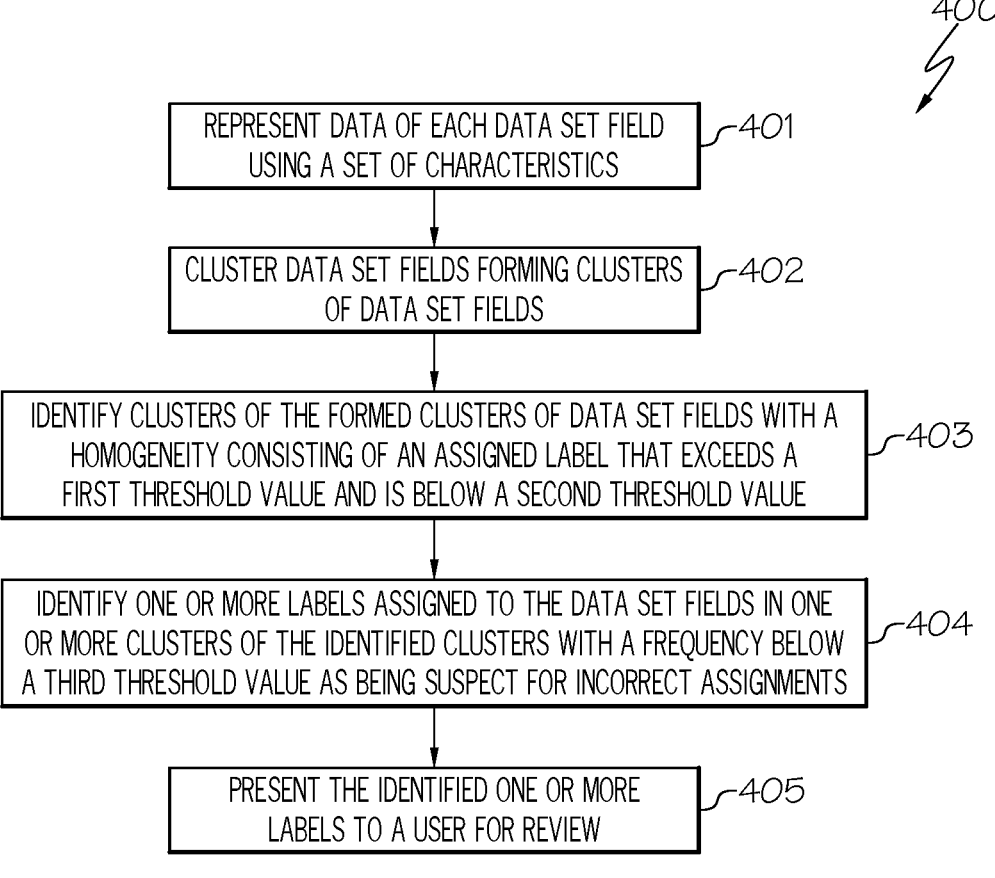

*400*

REPRESENT DATA OF EACH DATA SET FIELD
USING A SET OF CHARACTERISTICS    *401*

CLUSTER DATA SET FIELDS FORMING CLUSTERS
OF DATA SET FIELDS    *402*

IDENTIFY CLUSTERS OF THE FORMED CLUSTERS OF DATA SET FIELDS WITH A
HOMOGENEITY CONSISTING OF AN ASSIGNED LABEL THAT EXCEEDS A
FIRST THRESHOLD VALUE AND IS BELOW A SECOND THRESHOLD VALUE    *403*

IDENTIFY ONE OR MORE LABELS ASSIGNED TO THE DATA SET FIELDS IN ONE
OR MORE CLUSTERS OF THE IDENTIFIED CLUSTERS WITH A FREQUENCY BELOW
A THIRD THRESHOLD VALUE AS BEING SUSPECT FOR INCORRECT ASSIGNMENTS    *404*

PRESENT THE IDENTIFIED ONE OR MORE
LABELS TO A USER FOR REVIEW    *405*

601 — USE A SET OF MOMENTS AS FEATURES FOR THE CLUSTERING

602 — SCALE EACH MOMENT IN THE SET OF MOMENTS

603 — CALCULATE A DISTANCE BETWEEN EACH TWO DATA SET FIELDS USING THE SCALED MOMENTS TO CREATE A DISTANCE MATRIX

604 — RUN A CLUSTERING ALGORITHM ON DATA OF THE DATA SET FIELDS CLASSIFIED AS CATEGORICAL USING THE DISTANCE MATRIX AS A METRIC TO FORM CLUSTERS OF DATA SET FIELDS

DETECTING LABELS OF A DATA CATALOG INCORRECTLY ASSIGNED TO DATA SET FIELDS

TECHNICAL FIELD

The present disclosure relates generally to an enterprise data catalog, and more particularly to detecting labels of a data catalog, such as an enterprise data catalog, incorrectly assigned to data set fields.

BACKGROUND

An enterprise data catalog streamlines data discovery and access across data sources. For example, enterprise data catalogs have evolved to deliver governance capabilities, such as managing data quality and data privacy and compliance. It uses metadata and data management tools to organize all data assets within an organization. It synthesizes the information across the data ecosystem—from data lakes, data warehouses, and other data repositories—to empower authorized users to search for and access business-ready data for their projects and initiatives. It also serves as a governance tool to drive compliance with data privacy and industry regulations. In other words, an enterprise data catalog makes the use of data for insights generation far more efficient across the organization, while helping mitigate risks of regulatory violations.

In order to comply with regulation rules, such as general data protection regulation (GDPR), enterprises (e.g., organizations, companies, etc.) need to have full knowledge of what type of data is stored by the enterprise, and depending on the type of data, appropriate actions need to be performed (e.g., masking data, preventing access to the data, etc.).

Enterprises may store a significant amount of data, such as in a data lake (centralized repository that allows a user to store all structured and unstructured data at any scale), which requires enterprises to invest in enterprise data catalogs to provide them an index cataloging the data owned by the enterprise as well as metadata describing such data. Such metadata corresponds to a business glossary consisting of an ontology of business terms representing different types of concepts that may be relevant in the context of the enterprise. Predefined ontologies are available by different vendors and organizations in the form of industry models which are specific to a particular industry. A single industry model may contain thousands of business terms describing the stored data. When data sets are catalogued in the enterprise data catalog, they ideally need to have one of these business terms assigned to every field of the data set so that the business meaning of all these fields is documented and searchable.

SUMMARY

In one embodiment of the present disclosure, a computer-implemented method for detecting labels incorrectly assigned to data set fields comprises representing data of each data set field using a set of characteristics. The method further comprises clustering the data set fields using the set of characteristics forming clusters of data set fields. The method additionally comprises identifying clusters of the formed clusters of data set fields with a homogeneity consisting of an assigned label that exceeds a first threshold value and is below a second threshold value. Furthermore, the method comprises identifying one or more labels assigned to data set fields in one or more clusters of the identified clusters with a frequency below a third threshold value as being suspect for incorrect assignments. Additionally, the method comprises presenting the identified one or more labels to a user for review.

Furthermore, in one embodiment of the present disclosure, the set of characteristics comprise a set of moments in the data set field and a histogram of the data set field.

Additionally, in one embodiment of the present disclosure, the set of characteristics comprises a list of data values in the data set field and a count for each data value in the list of data values.

Furthermore, in one embodiment of the present disclosure, the clustering comprises classifying the data set fields as numeric or categorical.

Additionally, in one embodiment of the present disclosure, where the data set fields are classified as numeric, the method further comprises calculating a distance matrix of the data set fields classified as numeric. The method additionally comprises running a clustering algorithm on data of the data set fields classified as numeric using the distance matrix as a metric to form the clusters of data set fields. Furthermore, the method comprises splitting a cluster into multiple smaller clusters in response to the cluster of the formed clusters of data set fields having a silhouette score mean below a threshold value and/or a negative silhouette score. Additionally, the method comprises running the clustering algorithm on data of data set fields of the smaller clusters in response to splitting the cluster into the smaller clusters to determine a second silhouette score mean and/or a second silhouette score. In addition, the method comprises completing the clustering of the data set fields classified as numeric in response to each cluster of the data set fields classified as numeric not having the silhouette score mean below the threshold value and/or the negative silhouette score.

Furthermore, in one embodiment of the present disclosure, where the data set fields are classified as categorical, the method additionally comprises using a set of moments as features for the clustering. The method further comprises scaling each of the set of moments. Furthermore, the method comprises calculating a distance between the data set fields classified as categorical using the scaled set of moments to create a distance matrix. Additionally, the method comprises running a clustering algorithm on data of the data set fields classified as categorical using the distance matrix as a metric to form the clusters of data set fields.

Additionally, in one embodiment of the present disclosure, the data set fields comprise labeled and unlabeled data, where a label of the labeled data is presented as a label for other unlabeled data in response to the label being with a threshold degree of similarity to a greatest number of other labels of the labeled data.

Other forms of the embodiments of the computer-implemented method described above are in a system and in a computer program product.

In this manner, labels of a data catalog, such as an enterprise data catalog, that are incorrectly assigned to data set fields, such as the data set fields of a data set stored in a data lake, can now be detected.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 4 is a flowchart of a method for detecting labels of a data catalog that are incorrectly assigned to data set fields in accordance with an embodiment of the present disclosure;

DETAILED DESCRIPTION

Figure 1:
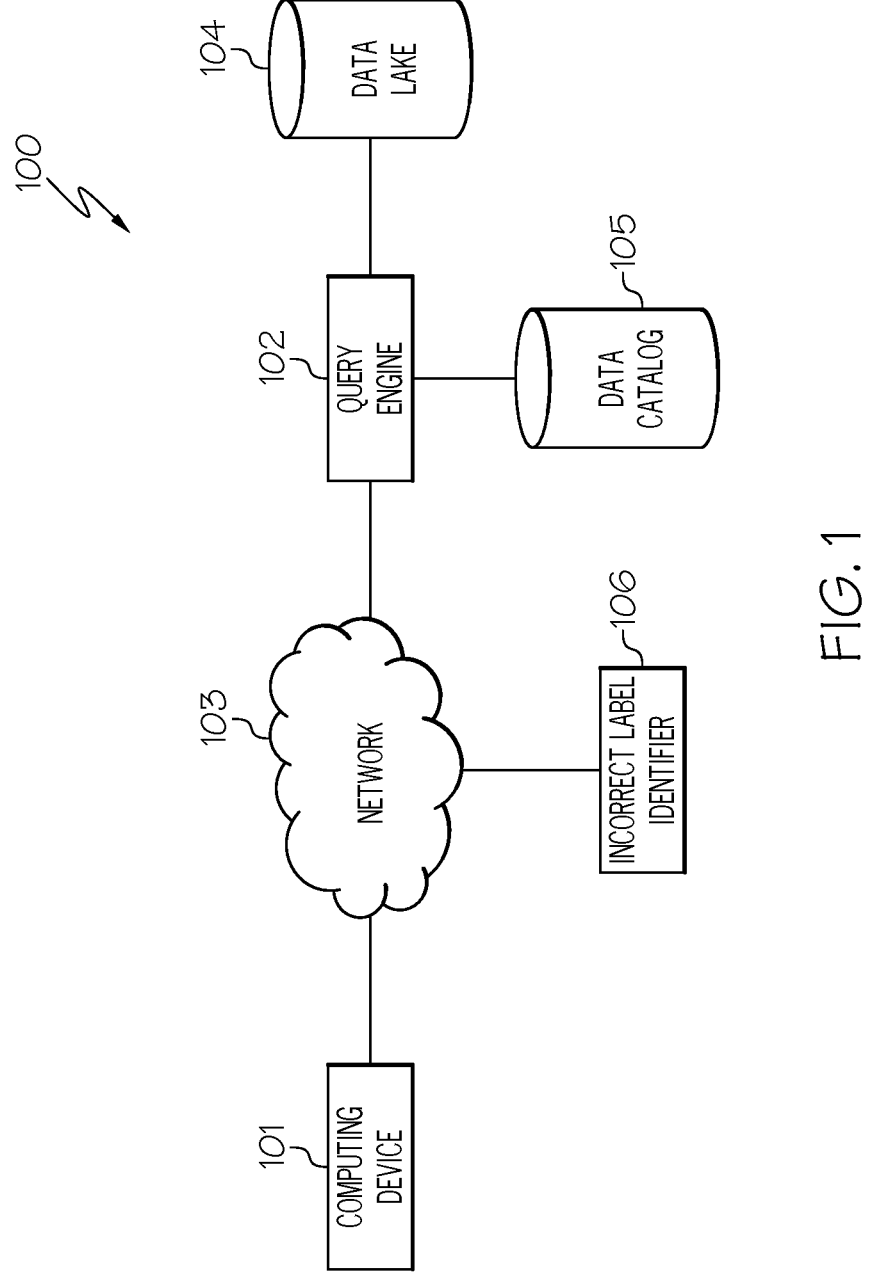
FIG. 1 illustrates a communication system for practicing the principles of the present disclosure in accordance with an embodiment of the present disclosure.

As stated above, in order to comply with regulation rules, such as general data protection regulation (GDPR), enterprises (e.g., organizations, companies, etc.) need to have full knowledge of what type of data is stored by the enterprise, and depending on the type of data, appropriate actions need to be performed (e.g., masking data, preventing access to the data, etc.).

Enterprises may store a significant amount of data, such as in a data lake (centralized repository that allows a user to store all structured and unstructured data at any scale), which requires enterprises to invest in enterprise data catalogs to provide them an index cataloging the data owned by the enterprise as well as metadata describing such data. Such metadata corresponds to a business glossary consisting of an ontology of business terms representing different types of concepts that may be relevant in the context of the enterprise. Predefined ontologies are available by different vendors and organizations in the form of industry models which are specific to a particular industry. A single industry model may contain thousands of business terms describing the stored data. When data sets are catalogued in the enterprise data catalog, they ideally need to have one of these business terms assigned to every field of the data set so that the business meaning of all these fields is documented and searchable.

Since such an enterprise data catalog may contain the information about hundreds of thousands of data sets, where each data set may have hundreds of fields, the process of cataloging enterprise data may involve assigning the "label" or appropriate business term to millions of data set fields.

For this reason, catalog vendors have an automated process to automatically assign the appropriate term to the stored data (data set fields) using various methods, such as applying predefined classifiers, analyzing the name of the assets (data set fields) and/or using a machine learning process to learn from assignments (assigning labels consisting of business terms to the stored data set fields) performed by the user.

Unfortunately, such assignments of the labels (business terms) may be incorrect. For example, such labels may be incorrectly assigned to a data set field due to improperly training the machine learning process, confusing metadata (business terms), misunderstanding of the ontology, etc. For instance, metadata may be confusing where the name of a field seems to indicate a particular meaning, but instead, has a different meaning due to the fact that the data in that field belongs to a different domain. In another example, the ontology may be misunderstood since multiple business terms or labels sound similar but have different meanings and the automated process selects the wrong label.

Unfortunately, there is not currently a means for identifying labels in the data catalog, such as an enterprise data catalog, that were improperly assigned to describe data fields of data sets.

The embodiments of the present disclosure provide a means for detecting labels in a catalog, such as an enterprise data catalog, that were improperly assigned to describe data fields of data sets by analyzing the characteristics of the data of all fields assigned to the same term. In situations in which the majority of the fields assigned to the same term have similar data characteristics, those fields with dissimilar data characteristics have a high probability of being misclassified. The labels assigned to such fields may then be presented to a user (e.g., expert) for review. A further discussion regarding these and other features is provided below.

While the following discusses the present disclosure in connection with data set fields containing numeric or categorical data, the principles of the preset disclosure may also apply to data set fields containing textual values. A person of ordinary skill in the art would be capable of applying the principles of the present disclosure to such implementations. Furthermore, embodiments applying the principles of the present disclosure to such implementations would fall within the scope of the present disclosure.

In some embodiments of the present disclosure, the present disclosure comprises a computer-implemented method, system and computer program product for detecting labels incorrectly assigned to data set fields. In one embodiment of the present disclosure, the data of each data set field, such as those data set fields assigned to the same label, are represented using a set of characteristics. A data set field, as used herein, refers to a set of values, which may be arranged in a table. Characteristics of the data set fields, as used herein, refer to the set of qualities or properties that applies to the data contained in the data set field. The data set fields are then clustered into clusters of data set fields based on the characteristics of the data of the data set fields. "Clustering," as used herein, refers to grouping data set fields that contain data with similar characteristics. In this manner, by grouping clusters of data set fields with similar characteristics, such clusters of data set fields are likely to share the same domain (area or sphere of knowledge). Those clusters of data set fields with a homogeneity (being assigned the same label) that exceeds a first threshold value and is below a second threshold value, where such threshold values may be user-designated, are identified. Homogeneity, as used herein, refers to the quality or state of the data set fields being assigned to the same label. In this manner, those clusters that are comprised of mainly one term being assigned to the data set fields of the cluster are identified. One or labels assigned to the data set fields of the identified clusters are identified as being suspect for incorrect assignments by having a frequency below a third threshold value (e.g., 3%), which may be user-designated. For example, if a cluster consists of two labels being assigned to the data set fields of the cluster, such as term T1 and term T2, and the percentage of data set fields being assigned by term T1 is 98% and the percentage of data set fields being assigned by term T2 is 2%, then it may be inferred that those data set fields assigned by term T2 are incorrect since the percentage of data set fields assigned by such a term is below a threshold value (e.g., 3%). The label(s) identified as being suspect for incorrect assignment are then presented to a user for review. In this manner, labels of a data catalog, such as an enterprise data catalog, that are incorrectly assigned to data set fields can now be detected.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a computing device 101 connected to a query engine 102 (e.g., structured query language (SQL) server) via a network 103. Furthermore, as illustrated in FIG. 1, query engine 102 is connected to a data lake 104 and a data catalog 105.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and query engine 102. It is noted that both computing device 101 and the user of computing device 101 may be identified with element number 101.

Network 103 may be, for example, a local area network, a wide area network, a wireless wide area network, a circuit-switched telephone network, a Global System for Mobile communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, the user of computing device 101 issues a query (e.g., SQL query) to query engine 102 (e.g., SQL server) configured to execute the query against data stored in data lake 104 to provide answers for users or applications. For example, such a query may be issued by the user to access, modify, insert, or delete data stored in data lake 104. A data lake 104, as used herein, refers to a centralized repository that allows a user to store all structured and unstructured data at any scale.

In one embodiment, query engine 102 is connected to data catalog 105 (e.g., enterprise data catalog), which streamlines data discovery and access across data sources. For example, data catalog 105 delivers governance capabilities, such as managing data quality and data privacy and compliance. It uses metadata and data management tools to organize all data assets within an organization, such as within data lake 104. It also serves as a governance tool to drive compliance with data privacy and industry regulations.

In one embodiment, data catalog 105 includes metadata corresponding to a business glossary consisting of an ontology of business terms representing different types of concepts that may be relevant in the context of the enterprise. In particular, such metadata includes labels (business terms of the business glossary) assigned to data set fields (data fields of the data sets) stored in data lake 104. In one embodiment, the assignment of such labels has been previously performed by an automated process or manually.

As previously discussed, such labels in data catalog 105 may not be correctly assigned to the data set fields. In one embodiment, incorrect label identifier 106 connected to network 103 is configured to detect improperly assigned labels in data catalog 105. In one embodiment, incorrect label identifier 105 detects labels in data catalog 105, such as an enterprise data catalog, that were incorrectly assigned to describe data fields of data sets, such as those data sets stored in data lake 104, by analyzing the characteristics of the data of all fields assigned to the same term. In situations in which the majority of the fields assigned to the same term have similar data characteristics, those fields with dissimilar data characteristics have a high probability of being misclassified. The labels of such fields may then be presented to a user (e.g., expert) for review. A more detailed description of these and other features will be provided below. Furthermore, a description of the software components of incorrect label identifier 106 is provided below in connection with FIG. 2 and a description of the hardware configuration of incorrect label identifier 106 is provided further below in connection with FIG. 3.

System 100 is not to be limited in scope to any one particular network architecture. System 100 may include any number of computing devices 101, query engines 102, networks 103, data lakes 104, data catalogs 105 and incorrect label identifiers 106.

A discussion regarding the software components used by incorrect label identifier 106 to detect improperly assigned labels in data catalog 105 is provided below in connection with FIG. 2.

Figure 2:
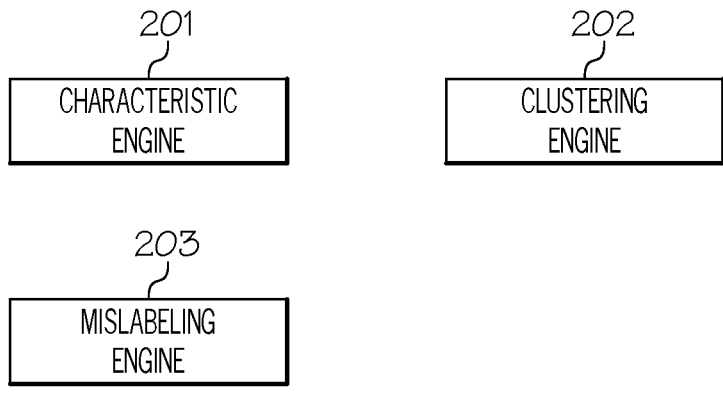
FIG. 2 is a diagram of the software components used by the incorrect label identifier to detect improperly assigned labels in a data catalog in accordance with an embodiment of the present disclosure.

FIG. 2 is a diagram of the software components used by incorrect label identifier 106 to detect improperly assigned labels in data catalog 105 in accordance with an embodiment of the present disclosure.

Referring to FIG. 2, in conjunction with FIG. 1, incorrect label identifier 106 includes characteristic engine 201 configured to represent the data of each data set field, such as those data set fields assigned to the same label, using a set of characteristics. In one embodiment, such data set fields are stored in data lake 104. A data set field, as used herein, refers to a set of values, which may be arranged in a table.

Characteristics of the data set fields, as used herein, refer to the set of qualities or properties that applies to the data contained in the data set field. For example, a characteristic of the data set field may correspond to a data type indicating what type of data the field can store (e.g., field contains only letters, numbers, and a limited set of punctuation characters). In another example, the characteristic of the data set field may indicate whether the data stored in the data set field corresponds to numeric or non-numeric data (e.g., sales amounts, total sales, customer names, database identifiers, URLs, images, spatial data, and e-mail addresses). In one embodiment, the characteristics of the data set fields include the dimensionality, sparsity, and resolution of the data in the data set fields.

In one embodiment, the characteristics to be extracted from the data set fields differ depending on the type of data. For example, for categorical data, moments (measures of the shape and variability of the data set fields) of the data set fields, such as mean, variance, skewness, and kurtosis, may be extracted. Furthermore, for categorical data, a histogram of the data set fields may be extracted. For numeric data, on the other hand, a list of all the different values in the data set fields with a count for each value is extracted, where the count represents how many instances of a value appear in the data set fields. These "fingerprints" can be used to model the data set field's distribution.

In one embodiment, characteristic engine 201 extracts the characteristics of the data set fields assigned to the same label using a feature extractor configured to extract the specified characteristics. For example, in one embedment, a user specifies the characteristics (set of qualities or properties) to be extracted from the data set fields, such as via the graphical user interface of incorrect label identifier 106. The feature extractor then extracts such requested characteristics from the data set fields. In one embodiment, characteristic engine 201 utilizes various software tools for extracting the characteristics of the data set fields using a feature extractor, which can include, but are not limited to, IBM® SPSS®, Tipalti®, Apify®, Grepsr, Veryfi, etc.

Incorrect label identifier 106 further includes a clustering engine 202 configured to cluster the data set fields forming clusters of data set fields based on the characteristics of the data of the data set fields. "Clustering," as used herein, refers to grouping data set fields that contain data with similar characteristics. In this manner, by grouping clusters of data set fields with similar characteristics, such clusters of data set fields are likely to share the same domain (area or sphere of knowledge). In one embodiment, clustering engine 202 clusters the data set fields based on the extracted characteristics discussed above. For example, those data set fields with the characteristic of the same data type may be clustered together.

In one embodiment, clustering engine 202 implements one of the following techniques for clustering: partitioning method, hierarchical method, density-based method, grid-based method, model-based method, and constraint-based method.

In one embodiment, clustering engine 202 employs a cluster model to cluster the data set fields forming clusters of data set fields based on the characteristics of the data of the data set fields. Examples of cluster models include, but not limited to, connectivity models (hierarchical clustering builds models based on distance connectivity), centroid models (k-means algorithm representing each cluster by a single mean vector), distribution models (clusters are modeled using statistical distributions, such as multivariate normal distributions used by an expectation-maximization algorithm), density models (e.g., Density-Based Spatial Clustering of Applications with Noise (DBSCAN)), group models, graph-based models, signed graph models (every path in a signed graph has a sign from the product of the signs on the edges), and neural models.

Furthermore, in one embodiment, clustering engine 202 employs a clustering algorithm to cluster the data set fields forming clusters of data set fields based on the characteristics of the data of the data set fields. Examples of clustering algorithms include, but not limited to, connectivity-based clustering, centroid-based clustering, distribution-based clustering, density-based clustering, and grid-based clustering.

In one embodiment, clustering engine 202 splits the data of the data set fields based on the type of data, such as numeric data and categorical data. In one embodiment, clustering engine 202 determines the type of data from the extracted data characteristics of the data set fields, which includes the type of data.

In one embodiment, after splitting the data of the data set fields based on the type of data, such as numeric data and categorical data, clustering engine 202 clusters the data in a particular manner based on such classification.

For example, in one embodiment, clustering engine 202 clusters numeric data by calculating a distance matrix of the data set fields. A "distance matrix," as used herein, is a table that shows the distance between pairs of data set fields. In one embodiment, clustering engine 202 calculates the distance matrix of the data set fields by calculating the Jaccard distance between each two data set fields. In one embodiment, the Jaccard distance measures the similarity between the data set fields and is defined as the size of the intersection divided by the size of the union of the data set fields.

Clustering engine 202 may then run a clustering algorithm on the data of the data set fields classified as numeric using the distance matrix as a metric to form clusters of data set fields. That is, clustering engine 202 performs clustering on the distance matrix. In one embodiment, such a clustering algorithm corresponds to a density-based clustering algorithm (e.g., Density-Based Spatial Clustering of Applications with Noise (DBSCAN)).

Furthermore, in one embodiment, clustering engine 202 determines if any of these clusters are underperforming. In one embodiment, clustering engine 202 identifies those clusters that are underperforming based on identifying those clusters with a low silhouette score mean (below a threshold value, which may be user-designated) and/or a negative silhouette score. Silhouette, as used herein, refers to a method of interpretation and validation of consistency within clusters of data. The silhouette value is a measure of how similar a data set field is to its own cluster (cohesion) compared to other clusters (separation). The mean of such silhouette values for the data set fields within a cluster is then calculated to form the silhouette score mean. In one embodiment, the silhouette value ranges from −1 to +1, where a high value indicates that the data set field is well matched to its own cluster and poorly matched to neighboring clusters. If most data set fields have a high value, then the clustering configuration is said to be "homogeneous." If many points have a low or negative value, then the clustering configuration may have too many or too few clusters.

In one embodiment, the silhouette coefficient/value is calculated using the mean intra-cluster distance (a) and the mean nearest-cluster distance (b) for each sample (data set field), where b is the distance between a sample (data set field) and the nearest cluster that the sample is not part of. The silhouette coefficient/value for a sample (data set field) is $(b-a)/\max(a, b)$.

In one embodiment, the silhouette value is calculated with a distance metric, such as the Euclidean distance or the Manhattan distance. The Euclidean distance between two points in Euclidean space is the length of a line segment between the two points. The Manhattan distance corresponds to the distance between two points measured along the axes at right angles.

If clustering engine 202 identifies any underperforming clusters with a low silhouette score mean (below a threshold value, which may be user-designated) and/or a negative silhouette score, then clustering engine 202 determines if the size of the underperforming cluster is too small to split, which may correspond to a threshold number of data set fields. In one embodiment, such a threshold is user designated.

If the cluster is too small to split, then the clustering of the data set fields classified as numeric is complete.

If, however, the cluster is not too small to split, then clustering engine 202 splits the cluster into smaller clusters.

In one embodiment, such splitting of a cluster into smaller clusters may be performed using hierarchical clustering. In one embodiment, clustering engine 202 splits a cluster into smaller clusters (e.g., two smaller clusters) in a top-down fashion. In one embodiment, clustering engine 202 splits a cluster into smaller clusters (e.g., two smaller clusters) using the K-means method.

In one embodiment, after splitting the underperforming clusters, clustering engine 202 runs the clustering algorithm on the split clusters to determine its silhouette scores discussed above and then determines if the split clusters are underperforming as discussed above.

If all the clusters are performing satisfactorily, then the clustering of the data set fields classified as numeric is complete.

In the embodiment in which clustering engine 202 splits the data of the data set fields based on the type of data, such as categorical data, clustering engine 202 clusters the data by using a set of moments (e.g., four moments) as features for the clustering. Moments, as used herein, refer to the measures of the shape and variability of the data set fields, such as mean, variance, skewness, and kurtosis.

Such moments are obtained by clustering engine 202 using various software tools, which can include, but are not limited to, IBM® SPSS®, JMP®, Minitab®, Posit®, OriginPro®, Stata®, etc.

Each moment in the set of moments may then be scaled by clustering engine 202. Scaling, as used herein, refers to transforming the data so that it fits within a specific scale (e.g., 0 to 1). In one embodiment, clustering engine 202 scales each moment in the set of moments using methods based on measures of how far apart data points are, such as support vector machines or k-nearest neighbors.

In one embodiment, clustering engine 202 calculates a distance between each two data set fields identified as categorical, such as by using data set fields' histograms, to create a distance matrix. As discussed above, a "distance matrix," as used herein, is a table that shows the distance between pairs of data set fields. In one embodiment, clustering engine 202 calculates the distance matrix of the data set fields by calculating the Wasserstein distance between each two data set fields. In one embodiment, the Wasserstein distance is a distance function defined between probability distributions on a given metric space M.

Clustering engine 202 may then run a clustering algorithm on the data of the data set fields classified as categorical using the distance matrix as a metric to form clusters of data set fields. That is, clustering engine 202 performs clustering on the distance matrix. In one embodiment, such a clustering algorithm corresponds to a density-based clustering algorithm (e.g., Density-Based Spatial Clustering of Applications with Noise (DBSCAN)).

Upon clustering the data set fields forming clusters of data set fields, in one embodiment, mislabeling engine 203 of incorrect label identifier 106 identifies those clusters with a homogeneity (being assigned the same label) that exceeds a first threshold value and is below a second threshold value, where such threshold values may be user-designated. Homogeneity, as used herein, refers to the quality or state of the data set fields being assigned to the same label. In this manner, mislabeling engine 203 identifies those clusters that are comprised of mainly one term being assigned to the data set fields.

In one embodiment, mislabeling engine 203 excludes or filters out those clusters with a very high homogeneity that exceeds a first threshold value, which indicates clusters that are perfect or close to perfect by only having one term being assigned to the data set fields. In such a scenario, there is not likely an issue with a label being incorrectly assigned to the data set fields.

Furthermore, in one embodiment, mislabeling engine 203 excludes or filters out those clusters with a low homogeneity that is below the second threshold value, indicating a cluster that does not have a significantly dominant term. For example, if a cluster that involves term T1 being assigned to 40% of the data set fields and term T2 being assigned to 60% of the data set fields, then such a cluster may be said to have low homogeneity since there is not a significantly dominant term being assigned to the data set fields.

In one embodiment, mislabeling engine 203 identifies those clusters with a homogeneity (being assigned the same label) that exceeds a first threshold value and is below a second threshold value, where such threshold values may be user-designated, by extracting the assigned labels assigned to the data set fields in the cluster from data catalog 105 (e.g., enterprise data catalog). In one embodiment, mislabeling engine 203 extracts the assigned labels assigned to the data set fields in the cluster using various software tools, which can include, but are not limited to, Stitch, IBM Watson® Knowledge Catalog, Alation®, Erwin®, OvalEdge®, Tableau®, etc.

In one embodiment, mislabeling engine 203 determines the homogeneity of the extracted labels based on counting the number of times each label has been assigned to a data set field in the cluster and then computing a percentage that such a label has been assigned to the total number of data set fields in the cluster. In one embodiment, upon identifying such percentages, mislabeling engine 203 compares the percentage of the most frequently assigned term with the first and second threshold values discussed above to ensure that such a label has not been assigned to essentially all of the data set fields and to ensure that such a label is the significantly dominant label. In one embodiment, such threshold values are user-designated. In one embodiment, mislabeling engine 203 uses various software tools for performing the aspect of determining the homogeneity of the clusters in such a manner using various software tools, which can include, but are not limited to, IBM® SPSS®, JMP®, Minitab®, Posit®, OriginPro®, Stata®, etc.

Furthermore, in one embodiment, mislabeling engine 203 identifies those labels that have been assigned sporadically in such homogeneity clusters (identified with a homogeneity that exceeds a first threshold value and is below a second threshold value), which are likely the result of mislabeling of the data set fields. In one embodiment, mislabeling engine 203 identifies such labels in the clusters previously identified by having a frequency below a third threshold value (e.g., 3%), which may be user-designated, as being suspect for incorrect assignments. For example, if a cluster consists of two labels being assigned to the data set fields of the cluster, such as term T1 and term T2, and the percentage of data set fields being assigned by term T1 is 98% and the percentage of data set fields being assigned by term T2 is 2%, then it may be inferred that those data set fields assigned by term T2 are incorrect since the percentage of data set fields assigned by such a term is below a threshold value (e.g., 3%).

In one embodiment, mislabeling engine 203 uses various software tools for identifying labels that are suspect for incorrect assignments by identifying such labels with a frequency below a third threshold value, which can include, but are not limited to, IBM® SPSS®, JMP®, Minitab®, Posit®, OriginPro®, Stata®, etc.

In one embodiment, mislabeling engine 203 presents such identified label(s) (those labels identified as being suspect for incorrect assignment) to a user, such as the user of incorrect label identifier 106, for review. In one embodiment, mislabeling engine 203 presents such identified label (s) to the user for review via electronic means (e.g., electronic mail, instant messaging, etc.). In another embodiment, mislabeling engine 203 presents such identified label(s) to the user for review via the graphical user interface of incorrect label identifier 106.

In one embodiment, the data set fields include a mix of labeled and unlabeled data (e.g., column of data, such as a database table). Clustering may then be performed on such mixed data by clustering engine 202 as discussed above. However, instead of highlighting potentially mislabeled data, if there is labeled data in a cluster, and if multiple labels of the labeled data agree within a threshold degree of similarity, where the threshold is user-designated, mislabeling engine 203 suggests that the label of the dominating labeled data is a potential label for the other unlabeled data (e.g., unlabeled columns). In this manner, the user is able to obtain automated assistance instead of manually labelling the entire data.

In one embodiment, the degree of similarity between the labels of the labeled data is determined by vectorizing the labels, which is converted into real-valued vectors. In one embodiment, after being converted into real-valued vectors, a similarity measure, such as cosine similarity or the Euclidean distance, may be used to determine the similarity between the two labels.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then mislabeling engine 203 deems such labels to be within a threshold degree of similarity.

In one embodiment, the Euclidean distance is calculated as the square root of the sum of the squared differences between the two feature vectors. If the distance exceeds a threshold value, which may be user-designated, then mislabeling engine 203 deems such labels to be within a threshold degree of similarity.

Upon performing such an analysis on multiple labels of the labeled data, a dominant label may be discovered where the dominant label corresponds to the label that is within a threshold degree of similarity of the greatest number of labels of the labeled data. Such a label may then be suggested as a potential label for the other unlabeled data (e.g., unlabeled columns).

A further description of these and other features is provided below in connection with the discussion of the method for detecting labels of a data catalog (e.g., data catalog 105) that are incorrectly assigned to data set fields, such as the data set fields of a data set stored in data lake 104.

Prior to the discussion of the method for detecting labels of a data catalog (e.g., data catalog 105) that are incorrectly assigned to data set fields, a description of the hardware configuration of incorrect label identifier 106 (FIG. 1) is provided below in connection with FIG. 3.

Figure 3:
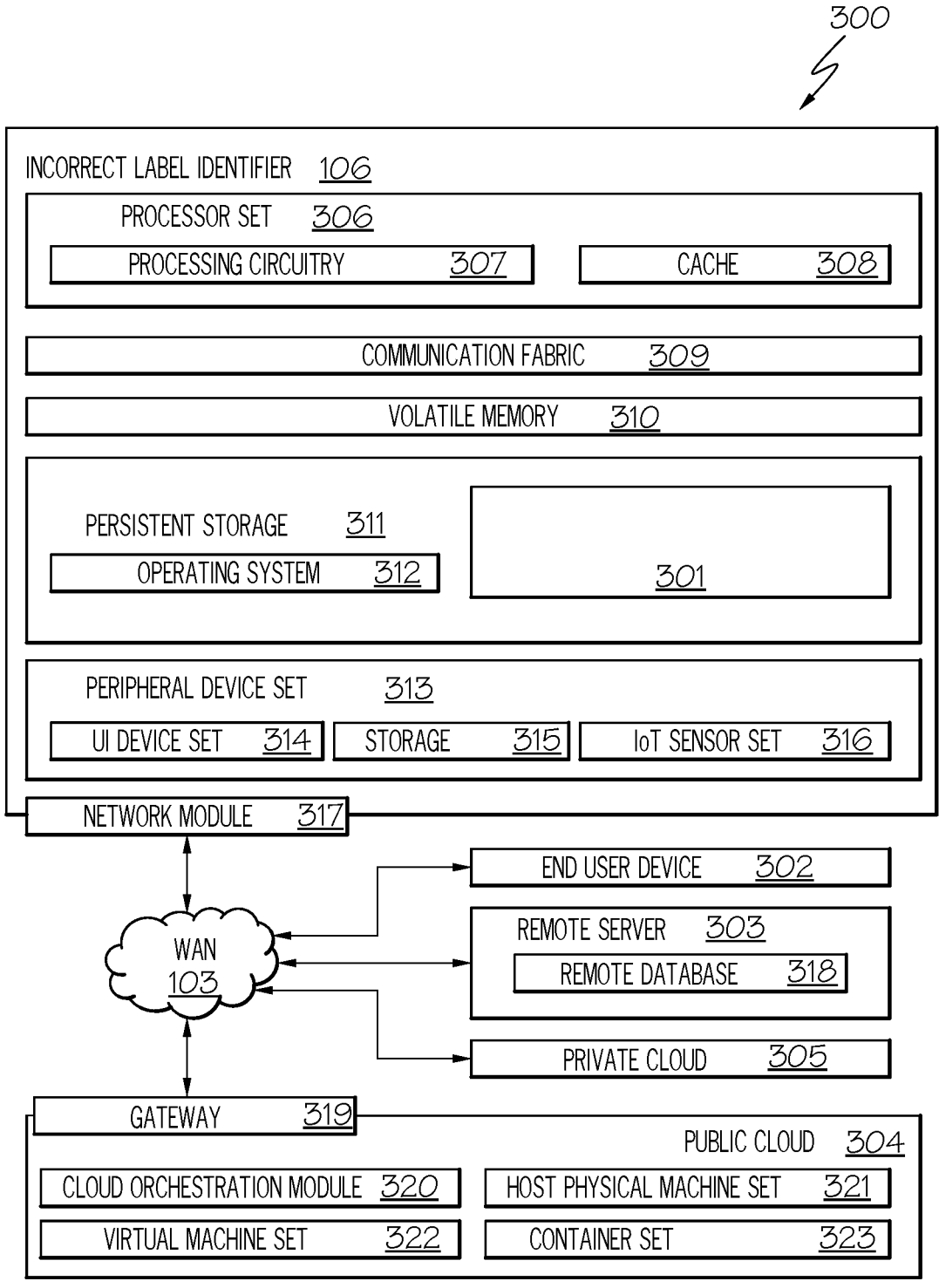
FIG. 3 illustrates an embodiment of the present disclosure of the hardware configuration of the incorrect label identifier which is representative of a hardware environment for practicing the present disclosure.

Referring now to FIG. 3, in conjunction with FIG. 1, FIG. 3 illustrates an embodiment of the present disclosure of the hardware configuration of incorrect label identifier 106 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc readonly memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code (computer code for detecting labels of a data catalog (e.g., data catalog 105) that are incorrectly assigned to data set fields, which is stored in block 301) involved in performing the disclosed methods, such as detecting labels of a data catalog (e.g., data catalog 105) that are incorrectly assigned to data set fields. In addition to block 301, computing environment 300 includes, for example, incorrect label identifier 106, network 103, such as a wide area network (WAN), end user device (EUD) 302, remote server 303, public cloud 304, and private cloud 305. In this embodiment, incorrect label identifier 106 includes processor set 306 (including processing circuitry 307 and cache 308), communication fabric 309, volatile memory 310, persistent storage 311 (including operating system 312 and block 301, as identified above), peripheral device set 313 (including user interface (UI) device set 314, storage 315, and Internet of Things (IoT) sensor set 316), and network module 317. Remote server 303 includes remote database 318. Public cloud 304 includes gateway 319, cloud orchestration module 320, host physical machine set 321, virtual machine set 322, and container set 323.

Incorrect label identifier 106 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 318. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically incorrect label identifier 106, to keep the presentation as simple as possible. Incorrect label identifier 106 may be located in a cloud, even though it is not shown in a cloud in FIG. 3. On the other hand, incorrect label identifier 106 is not required to be in a cloud except to any extent as may be affirmatively indicated.

Processor set 306 includes one, or more, computer processors of any type now known or to be developed in the future. Processing circuitry 307 may be distributed over multiple packages, for example, multiple, coordinated integrated circuit chips. Processing circuitry 307 may implement multiple processor threads and/or multiple processor cores. Cache 308 is memory that is located in the processor chip package(s) and is typically used for data or code that should be available for rapid access by the threads or cores running on processor set 306. Cache memories are typically organized into multiple levels depending upon relative proximity to the processing circuitry. Alternatively, some, or all, of the cache for the processor set may be located "off chip." In some computing environments, processor set 306 may be designed for working with qubits and performing quantum computing.

Computer readable program instructions are typically loaded onto incorrect label identifier 106 to cause a series of operational steps to be performed by processor set 306 of incorrect label identifier 106 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 308 and the other storage media discussed below. The program instructions, and associated data, are accessed by processor set 306 to control and direct performance of the inventive methods. In computing environment 300, at least some of the instructions for performing the inventive methods may be stored in block 301 in persistent storage 311.

Communication fabric 309 is the signal conduction paths that allow the various components of incorrect label identifier 106 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 310 is any type of volatile memory now known or to be developed in the future. Examples include dynamic type random access memory (RAM) or static type RAM. Typically, the volatile memory is characterized by random access, but this is not required unless affirmatively indicated. In incorrect label identifier 106, the volatile memory 310 is located in a single package and is internal to incorrect label identifier 106, but, alternatively or additionally, the volatile memory may be distributed over multiple packages and/or located externally with respect to incorrect label identifier 106.

Persistent Storage 311 is any form of non-volatile storage for computers that is now known or to be developed in the future. The non-volatility of this storage means that the stored data is maintained regardless of whether power is being supplied to incorrect label identifier 106 and/or directly to persistent storage 311. Persistent storage 311 may be a read only memory (ROM), but typically at least a portion of the persistent storage allows writing of data, deletion of data and re-writing of data. Some familiar forms of persistent storage include magnetic disks and solid state storage devices. Operating system 312 may take several forms, such as various known proprietary operating systems or open source Portable Operating System Interface type operating systems that employ a kernel. The code included in block 301 typically includes at least some of the computer code involved in performing the inventive methods.

Peripheral device set 313 includes the set of peripheral devices of incorrect label identifier 106. Data communication connections between the peripheral devices and the other components of incorrect label identifier 106 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 314 may include components such as a display screen, speaker, microphone, wearable devices (such as goggles and smart watches), keyboard, mouse, printer, touchpad, game controllers, and haptic devices. Storage 315 is external storage, such as an external hard drive, or insertable storage, such as an SD card. Storage 315 may be persistent and/or volatile. In some embodiments, storage 315 may take the form of a quantum computing storage device for storing data in the form of qubits. In embodiments where incorrect label identifier 106 is required to have a large amount of storage (for example, where incorrect label identifier 106 locally stores and manages a large database) then this storage may be provided by peripheral storage devices designed for storing very large amounts of data, such as a storage area network (SAN) that is shared by multiple, geographically distributed computers. IoT sensor set 316 is made up of sensors that can be used in Internet of Things applications. For example, one sensor may be a thermometer and another sensor may be a motion detector.

Network module 317 is the collection of computer software, hardware, and firmware that allows incorrect label identifier 106 to communicate with other computers through WAN 103. Network module 317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 317 are performed on the same physical hardware device. In other embodiments (for example, embodiments that utilize software-defined networking (SDN)), the control functions and the forwarding functions of network module 317 are performed on physically separate devices, such that the control functions manage several different network hardware devices. Computer readable program instructions for performing the inventive methods can typically be downloaded to incorrect label identifier 106 from an external computer or external storage device through a network adapter card or network interface included in network module 317.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 302 is any computer system that is used and controlled by an end user (for example, a customer of an enterprise that operates incorrect label identifier 106), and may take any of the forms discussed above in connection with incorrect label identifier 106. EUD 302 typically receives helpful and useful data from the operations of incorrect label identifier 106. For example, in a hypothetical case where incorrect label identifier 106 is designed to provide a recommendation to an end user, this recommendation would typically be communicated from network module 317 of incorrect label identifier 106 through WAN 103 to EUD 302. In this way, EUD 302 can display, or otherwise present, the recommendation to an end user. In some embodiments, EUD 302 may be a client device, such as thin client, heavy client, mainframe computer, desktop computer and so on.

Remote server 303 is any computer system that serves at least some data and/or functionality to incorrect label identifier 106. Remote server 303 may be controlled and used by the same entity that operates incorrect label identifier 106. Remote server 303 represents the machine(s) that collect and store helpful and useful data for use by other computers, such as incorrect label identifier 106. For example, in a hypothetical case where incorrect label identifier 106 is designed and programmed to provide a recommendation based on historical data, then this historical data may be provided to incorrect label identifier 106 from remote database 318 of remote server 303.

Public cloud 304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 304 is performed by the computer hardware and/or software of cloud orchestration module 320. The computing resources provided by public cloud 304 are typically implemented by virtual computing environments that run on various computers making up the computers of host physical machine set 321, which is the universe of physical computers in and/or available to public cloud 304. The virtual computing environments (VCEs) typically take the form of virtual machines from virtual machine set 322 and/or containers from container set 323. It is understood that these VCEs may be stored as images and may be transferred among and between the various physical machine hosts, either as images or after instantiation of the VCE. Cloud orchestration module 320 manages the transfer and storage of images, deploys new instantiations of VCEs and manages active instantiations of VCE deployments. Gateway 319 is the collection of computer software, hardware, and firmware that allows public cloud 304 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 305 is similar to public cloud 304, except that the computing resources are only available for use by a single enterprise. While private cloud 305 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 304 and private cloud 305 are both part of a larger hybrid cloud.

Block 301 further includes the software components discussed above in connection with FIG. 2 to detect labels of a data catalog (e.g., data catalog 105) that are incorrectly assigned to data set fields, such as the data set fields of a data set stored in data lake 104. In one embodiment, such components may be implemented in hardware. The functions discussed above performed by such components are not generic computer functions. As a result, incorrect label identifier 106 is a particular machine that is the result of implementing specific, non-generic computer functions.

In one embodiment, the functionality of such software components of incorrect label identifier 106, including the functionality for detecting labels of a data catalog (e.g., data catalog 105) that are incorrectly assigned to data set fields, such as the data set fields of a data set stored in data lake 104, may be embodied in an application specific integrated circuit.

As stated above, in order to comply with regulation rules, such as general data protection regulation (GDPR), enterprises (e.g., organizations, companies, etc.) need to have full knowledge of what type of data is stored by the enterprise, and depending on the type of data, appropriate actions need to be performed (e.g., masking data, preventing access to the data, etc.). Enterprises may store a significant amount of data, such as in a data lake (centralized repository that allows a user to store all structured and unstructured data at any scale), which requires enterprises to invest in enterprise data catalogs to provide them an index cataloging the data owned by the enterprise as well as metadata describing such data. Such metadata corresponds to a business glossary consisting of an ontology of business terms representing different types of concepts that may be relevant in the context of the enterprise. Predefined ontologies are available by different vendors and organizations in the form of industry models which are specific to a particular industry. A single industry model may contain thousands of business terms describing the stored data. When data sets are catalogued in the enterprise data catalog, they ideally need to have one of these business terms assigned to every field of the data set so that the business meaning of all these fields is documented and searchable. Since such an enterprise data catalog may contain the information about hundreds of thousands of data sets, where each data set may have hundreds of fields, the process of cataloging enterprise data may involve assigning the "label" or appropriate business term to millions of data set fields. For this reason, catalog vendors have an automated process to automatically assign the appropriate term to the stored data (data set fields) using various methods, such as applying predefined classifiers, analyzing the name of the assets (data set fields) and/or using a machine learning process to learn from assignments (assigning labels consisting of business terms to the stored data set fields) performed by the user. Unfortunately, such assignments of the labels (business terms) may be incorrect. For example, such labels may be incorrectly assigned to a data set field due to improperly training the machine learning process, confusing metadata (business terms), misunderstanding of the ontology, etc. For instance, metadata may be confusing where the name of a field seems to indicate a particular meaning, but instead, has a different meaning due to the fact that the data in that field belongs to a different domain. In another example, the ontology may be misunderstood since multiple business terms or labels sound similar but have different meanings and the automated process selects the wrong label. Unfortunately, there is not currently a means for identifying labels in the data catalog, such as an enterprise data catalog, that were improperly assigned to describe data fields of data sets.

Figure 5:
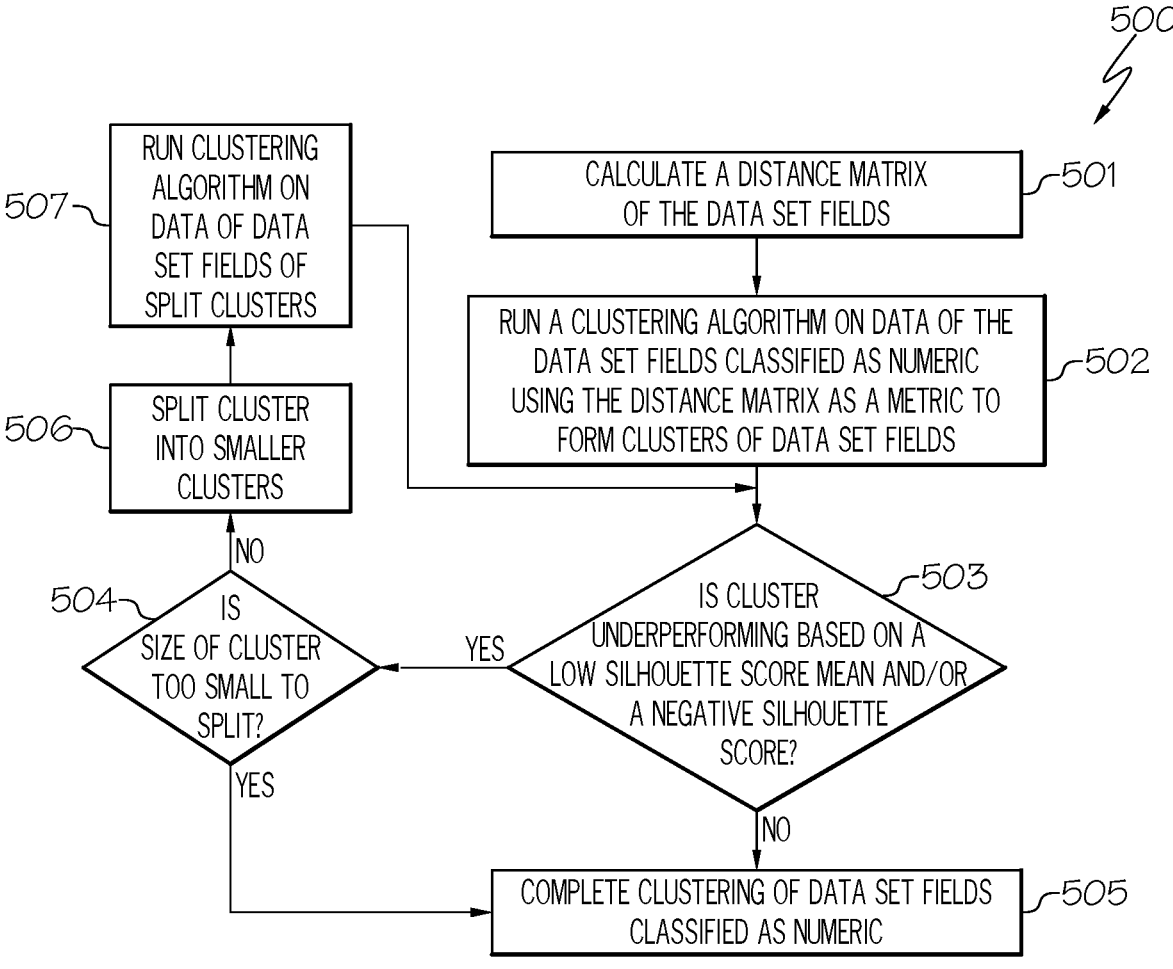
FIG. 5 is a flowchart of a method for clustering data of the data set fields classified as numeric in accordance with an embodiment of the present disclosure.
Figure 6:
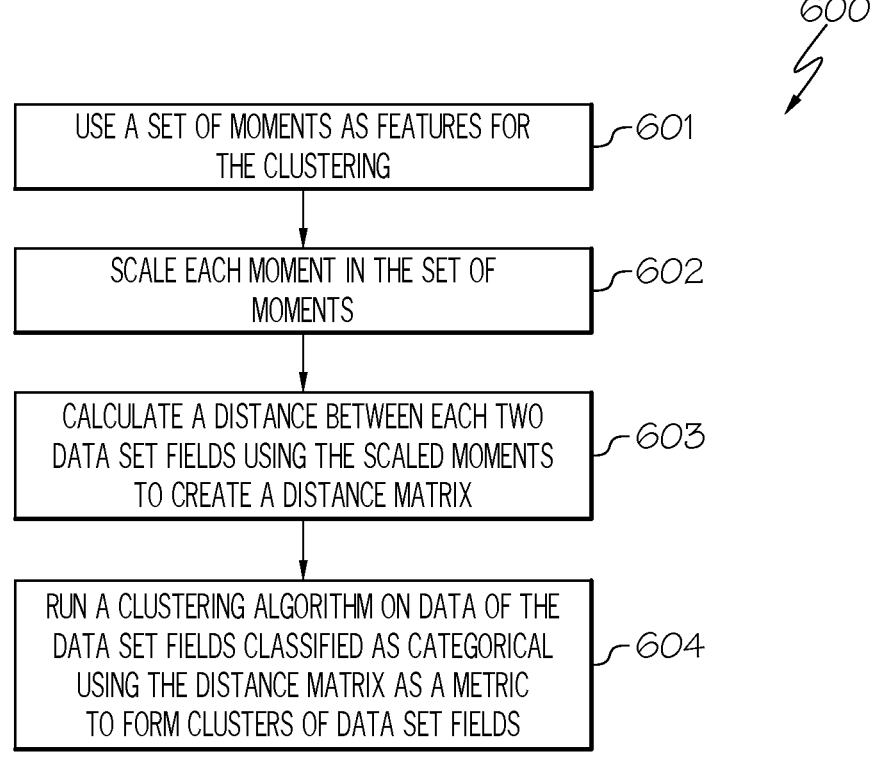
FIG. 6 is a flowchart of a method for clustering data of the data set fields classified as categorical in accordance with an embodiment of the present disclosure.

The embodiments of the present disclosure provide a means for detecting labels of a data catalog (e.g., data catalog 105) that are incorrectly assigned to data set fields, such as the data set fields of a data set stored in data lake 104, as discussed below in connection with FIGS. 4-6. FIG. 4 is a flowchart of a method for detecting labels of a data catalog (e.g., data catalog 105) that are incorrectly assigned to data set fields. FIG. 5 is a flowchart of a method for clustering data of the data set fields classified as numeric. FIG. 6 is a flowchart of a method for clustering data of the data set fields classified as categorical.

As stated above, FIG. 4 is a flowchart of a method 400 for detecting labels of a data catalog (e.g., data catalog 105) that are incorrectly assigned to data set fields, such as the data set fields of a data set stored in data lake 104, in accordance with an embodiment of the present disclosure.

Referring to FIG. 4, in conjunction with FIGS. 1-3, in operation 401, characteristic engine 201 of incorrect label identifier 106 represents the data of each data set field, such as those data set fields assigned to the same label, using a set of characteristics. A data set field, as used herein, refers to a set of values, which may be arranged in a table. In one embodiment, such data set fields are stored in data lake 104.

As discussed above, characteristics of the data set fields, as used herein, refer to the set of qualities or properties that applies to the data contained in the data set field. For example, a characteristic of the data set field may correspond to a data type indicating what type of data the field can store (e.g., field contains only letters, numbers, and a limited set of punctuation characters). In another example, the characteristic of the data set field may indicate whether the data stored in the data set field corresponds to numeric or non-numeric data (e.g., sales amounts, total sales, customer names, database identifiers, URLs, images, spatial data, and e-mail addresses). In one embodiment, the characteristics of the data set fields include the dimensionality, sparsity, and resolution of the data in the data set fields.

In one embodiment, the characteristics to be extracted from the data set fields differ depending on the type of data. For example, for categorical data, moments (measures of the shape and variability of the data set fields) of the data set fields, such as mean, variance, skewness, and kurtosis, may be extracted. Furthermore, for categorical data, a histogram of the data set fields may be extracted. For numeric data, on the other hand, a list of all the different values in the data set fields with a count for each value is extracted, where the count represents how many instances of a value appear in the data set fields. These "fingerprints" can be used to model the data set field's distribution.

In one embodiment, characteristic engine 201 extracts the characteristics of the data set fields assigned to the same label using a feature extractor configured to extract the specified characteristics. For example, in one embedment, a user specifies the characteristics (set of qualities or properties) to be extracted from the data set fields, such as via the graphical user interface of incorrect label identifier 106. The feature extractor then extracts such requested characteristics from the data set fields. In one embodiment, characteristic engine 201 utilizes various software tools for extracting the characteristics of the data set fields using a feature extractor, which can include, but are not limited to, IBM® SPSS®, Tipalti®, Apify®, Grepsr, Veryfi, etc.

In operation 402, clustering engine 202 of incorrect label identifier 106 clusters the data set fields forming clusters of data set fields based on the characteristics of the data of the data set fields. "Clustering," as used herein, refers to grouping data set fields that contain data with similar characteristics. In this manner, by grouping clusters of data set fields with similar characteristics, such clusters of data set fields are likely to share the same domain (area or sphere of knowledge). In one embodiment, clustering engine 202 clusters the data set fields based on the extracted characteristics discussed above. For example, those data set fields with the characteristic of the same data type may be clustered together.

As stated above, in one embodiment, clustering engine 202 implements one of the following techniques for clustering: partitioning method, hierarchical method, density-based method, grid-based method, model-based method, and constraint-based method.

In one embodiment, clustering engine 202 employs a cluster model to cluster the data set fields forming clusters of data set fields based on the characteristics of the data of the data set fields. Examples of cluster models include, but not limited to, connectivity models (hierarchical clustering builds models based on distance connectivity), centroid models (k-means algorithm representing each cluster by a single mean vector), distribution models (clusters are modeled using statistical distributions, such as multivariate normal distributions used by an expectation-maximization algorithm), density models (e.g., Density-Based Spatial Clustering of Applications with Noise (DBSCAN)), group models, graph-based models, signed graph models (every path in a signed graph has a sign from the product of the signs on the edges), and neural models.

Furthermore, in one embodiment, clustering engine 202 employs a clustering algorithm to cluster the data set fields forming clusters of data set fields based on the characteristics of the data of the data set fields. Examples of clustering algorithms include, but not limited to, connectivity-based clustering, centroid-based clustering, distribution-based clustering, density-based clustering, and grid-based clustering.

In one embodiment, clustering engine 202 splits the data of the data set fields based on the type of data, such as numeric data and categorical data. In one embodiment, clustering engine 202 determines the type of data from the extracted data characteristics of the data set fields, which includes the type of data.

In one embodiment, after splitting the data of the data set fields based on the type of data, such as numeric data and categorical data, clustering engine 202 clusters the data in a particular manner based on such classification as discussed below in connection with FIGS. 5 and 6. For example, a discussion regarding clustering engine 202 clustering data classified as numeric is discussed below in connection with FIG. 5 and a discussion regarding clustering engine 202 clustering data classified as categorical is discussed below in connection with FIG. 6.

As stated above, FIG. 5 is a flowchart of a method 500 for clustering data of the data set fields classified as numeric in accordance with an embodiment of the present disclosure.

Referring to FIG. 5, in conjunction with FIGS. 1-4, in operation 501, clustering engine 202 of incorrect label identifier 106 calculates a distance matrix of the data set fields. A "distance matrix," as used herein, is a table that shows the distance between pairs of data set fields.

As stated above, in one embodiment, clustering engine 202 calculates the distance matrix of the data set fields by calculating the Jaccard distance between each two data set fields. In one embodiment, the Jaccard distance measures the similarity between the data set fields and is defined as the size of the intersection divided by the size of the union of the data set fields.

In operation 502, clustering engine 202 of incorrect label identifier 106 runs a clustering algorithm on the data of the data set fields classified as numeric using the distance matrix as a metric to form clusters of data set fields. That is, clustering engine 202 performs clustering on the distance matrix. In one embodiment, such a clustering algorithm corresponds to a density-based clustering algorithm (e.g., Density-Based Spatial Clustering of Applications with Noise (DBSCAN)).

In operation 503, clustering engine 202 of incorrect label identifier 106 determines if any of these clusters are underperforming.

As discussed above, in one embodiment, clustering engine 202 identifies those clusters that are underperforming based on identifying those clusters with a low silhouette score mean (below a threshold value, which may be user-designated) and/or a negative silhouette score. Silhouette, as used herein, refers to a method of interpretation and validation of consistency within clusters of data. The silhouette value is a measure of how similar a data set field is to its own cluster (cohesion) compared to other clusters (separation). The mean of such silhouette values for the data set fields within a cluster is then calculated to form the silhouette score mean. In one embodiment, the silhouette value ranges from $-1$ to $+1$, where a high value indicates that the data set field is well matched to its own cluster and poorly matched to neighboring clusters. If most data set fields have a high value, then the clustering configuration is said to be "homogeneous." If many points have a low or negative value, then the clustering configuration may have too many or too few clusters.

In one embodiment, the silhouette coefficient/value is calculated using the mean intra-cluster distance (a) and the mean nearest-cluster distance (b) for each sample (data set field), where b is the distance between a sample (data set field) and the nearest cluster that the sample is not part of. The silhouette coefficient/value for a sample (data set field) is (b–a)/max(a, b).

In one embodiment, the silhouette value is calculated with a distance metric, such as the Euclidean distance or the Manhattan distance. The Euclidean distance between two points in Euclidean space is the length of a line segment between the two points. The Manhattan distance corresponds to the distance between two points measured along the axes at right angles.

If clustering engine 202 identifies any underperforming clusters with a low silhouette score mean (below a threshold value, which may be user-designated) and/or a negative silhouette score, then, in operation 504, clustering engine 202 of incorrect label identifier 106 determines if the size of the underperforming cluster is too small to split, which may correspond to a threshold number of data set fields. In one embodiment, such a threshold is user designated.

If the cluster is too small to split, then, in operation 505, clustering engine 202 of incorrect label identifier 106 completes the clustering of the data set fields classified as numeric.

If, however, the cluster is not too small to split, then, in operation 506, clustering engine 202 of incorrect label identifier 106 splits the cluster into smaller clusters.

As stated above, in one embodiment, such splitting of a cluster into smaller clusters may be performed using hierarchical clustering. In one embodiment, clustering engine 202 splits a cluster into smaller clusters (e.g., two smaller clusters) in a top-down fashion. In one embodiment, clustering engine 202 splits a cluster into smaller clusters (e.g., two smaller clusters) using the K-means method.

In one embodiment, after splitting the underperforming clusters, in operation 507, clustering engine 202 of incorrect label identifier 106 runs the clustering algorithm on the data of the data set fields of the split clusters to determine its silhouette scores discussed above. Clustering engine 202 of incorrect label identifier 106 then determines if the split clusters are underperforming as discussed above in connection with operation 503.

Referring to operation 503, if all the clusters are performing satisfactorily, then, in operation 505, clustering engine 202 of incorrect label identifier 106 completes the clustering of the data set fields classified as numeric.

In the embodiment in which clustering engine 202 splits the data of the data set fields based on the type of data, such as categorical data, clustering engine 202 clusters such categorical data as discussed below in connection with FIG. 6.

FIG. 6 is a flowchart of a method 600 for clustering data of the data set fields classified as categorical in accordance with an embodiment of the present disclosure.

Referring to FIG. 6, in conjunction with FIGS. 1-4, in operation 601, clustering engine 202 of incorrect label identifier 106 uses a set of moments (e.g., four moments) as features for the clustering. Moments, as used herein, refer to the measures of the shape and variability of the data set fields, such as mean, variance, skewness, and kurtosis.

As discussed above, such moments are obtained by clustering engine 202 using various software tools, which can include, but are not limited to, IBM® SPSS®, JMP®, Minitab®, Posit®, OriginPro®, Stata®, etc.

In operation 602, clustering engine 202 of incorrect label identifier 106 scales each moment in the set of moments.

As stated above, scaling, as used herein, refers to transforming the data so that it fits within a specific scale (e.g., 0 to 1). In one embodiment, clustering engine 202 scales each moment in the set of moments using methods based on measures of how far apart data points are, such as support vector machines or k-nearest neighbors.

In operation 603, clustering engine 202 of incorrect label identifier 106 calculates a distance between each two data set fields identified as categorical, such as by using the scaled moments, to create a distance matrix.

As discussed above, a "distance matrix," as used herein, is a table that shows the distance between pairs of data set fields. In one embodiment, clustering engine 202 calculates the distance matrix of the data set fields by calculating the Wasserstein distance between each two data set fields using the scaled set of moments. In one embodiment, the Wasserstein distance is a distance function defined between probability distributions on a given metric space M as defined by the scaled set of moments.

In operation 604, clustering engine 202 of incorrect label identifier 106 runs a clustering algorithm on the data of the data set fields classified as categorical using the distance matrix as a metric to form clusters of data set fields. That is, clustering engine 202 performs clustering on the distance matrix.

As stated above, in one embodiment, such a clustering algorithm corresponds to a density-based clustering algorithm (e.g., Density-Based Spatial Clustering of Applications with Noise (DBSCAN)).

Returning to FIG. 4, in conjunction with FIGS. 1-3 and 5-6, upon clustering the data set fields forming clusters of data set fields, such as discussed above in connection with FIGS. 5 and 6, in one embodiment, in operation 403, mislabeling engine 203 of incorrect label identifier 106 identifies those clusters of data set fields with a homogeneity consisting of an assigned label that exceeds a first threshold value and is below a second threshold value, where such threshold values may be user-designated. Homogeneity, as used herein, refers to the quality or state of the data set fields being assigned to the same label. In this manner, mislabeling engine 203 identifies those clusters that are comprised of mainly one term being assigned to the data set fields.

As discussed above, in one embodiment, mislabeling engine 203 excludes or filters out those clusters with a very high homogeneity that exceeds a first threshold value, which indicates clusters that are perfect or close to perfect by only having one term being assigned to the data set fields. In such a scenario, there is not likely an issue with a label being incorrectly assigned to the data set fields.

Furthermore, in one embodiment, mislabeling engine 203 excludes or filters out those clusters with a low homogeneity that is below the second threshold value, indicating a cluster that does not have a significantly dominant term. For example, if a cluster that involves term T1 being assigned to 40% of the data set fields and term T2 being assigned to 60% of the data set fields, then such a cluster may be said to have low homogeneity since there is not a significantly dominant term being assigned to the data set fields.

In one embodiment, mislabeling engine 203 identifies those clusters with a homogeneity (being assigned the same label) that exceeds a first threshold value and is below a second threshold value, where such threshold values may be user-designated, by extracting the assigned labels assigned to the data set fields in the cluster from data catalog 105 (e.g., enterprise data catalog). In one embodiment, mislabeling engine 203 extracts the assigned labels assigned to the data set fields in the cluster using various software tools, which can include, but are not limited to, Stitch, IBM Watson® Knowledge Catalog, Alation®, Erwin®, OvalEdge®, Tableau®, etc.

In one embodiment, mislabeling engine 203 determines the homogeneity of the extracted labels based on counting the number of times each label has been assigned to a data set field in the cluster and then computing a percentage that such a label has been assigned to the total number of data set fields in the cluster. In one embodiment, upon identifying such percentages, mislabeling engine 203 compares the percentage of the most frequently assigned term with the first and second threshold values discussed above to ensure that such a label has not been assigned to essentially all of the data set fields and to ensure that such a label is the significantly dominant label. In one embodiment, such threshold values are user-designated. In one embodiment, mislabeling engine 203 uses various software tools for performing the aspect of determining the homogeneity of the clusters in such a manner using various software tools, which can include, but are not limited to, IBM® SPSS®, JMP®, Minitab®, Posit®, OriginPro®, Stata®, etc.

In operation 404, mislabeling engine 203 of incorrect label identifier 106 identifies one or more labels that have been assigned sporadically in such homogeneity clusters (identified in operation 403), which are likely the result of mislabeling of the data set fields. In one embodiment, mislabeling engine 203 identifies such labels assigned to the data set fields of the clusters identified in operation 403 that are suspect for incorrect assignments by having a frequency below a third threshold value (e.g., 3%), which may be user-designated. For example, if a cluster consists of two labels being assigned to the data set fields of the cluster, such as term T1 and term T2, and the percentage of data set fields being assigned by term T1 is 98% and the percentage of data set fields being assigned by term T2 is 2%, then it may be inferred that those data set fields assigned by term T2 are incorrect since the percentage of data set fields assigned by such a term is below a threshold value (e.g., 3%).

As stated above, in one embodiment, mislabeling engine 203 uses various software tools for identifying labels that are suspect for incorrect assignments by identifying such labels with a frequency below a third threshold value, which can include, but are not limited to, IBM® SPSS®, JMP®, Minitab®, Posit®, OriginPro®, Stata®, etc.

In operation 405, mislabeling engine 203 of incorrect label identifier 106 presents such identified label(s) (those labels identified as being suspect for incorrect assignment in operation 404) to a user, such as the user of incorrect label identifier 106, for review.

As discussed above, in one embodiment, mislabeling engine 203 presents such identified label(s) to the user for review via electronic means (e.g., electronic mail, instant messaging, etc.). In another embodiment, mislabeling engine 203 presents such identified label(s) to the user for review via the graphical user interface of incorrect label identifier 106.

In one embodiment, the data set fields include a mix of labeled and unlabeled data (e.g., column of data, such as a database table). Clustering may then be performed on such mixed data by clustering engine 202 as discussed above. However, instead of highlighting potentially mislabeled data, if there is labeled data in a cluster, and if multiple labels of the labeled data agree within a threshold degree of similarity, where the threshold is user-designated, mislabeling engine 203 suggests that the label of the dominating labeled data is a potential label for the other unlabeled data (e.g., unlabeled columns). In this manner, the user is able to obtain automated assistance instead of manually labelling the entire data.

In one embodiment, the degree of similarity between the labels of the labeled data is determined by vectorizing the labels, which is converted into real-valued vectors. In one embodiment, after being converted into real-valued vectors, a similarity measure, such as cosine similarity or the Euclidean distance, may be used to determine the similarity between the two labels.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then mislabeling engine 203 deems such labels to be within a threshold degree of similarity.

In one embodiment, the Euclidean distance is calculated as the square root of the sum of the squared differences between the two feature vectors. If the distance exceeds a threshold value, which may be user-designated, then mislabeling engine 203 deems such labels to be within a threshold degree of similarity.

Upon performing such an analysis on multiple labels of the labeled data, a dominant label may be discovered where the dominant label corresponds to the label that is within a threshold degree of similarity of the greatest number of labels of the labeled data. Such a label may then be suggested as a potential label for the other unlabeled data (e.g., unlabeled columns).

In this manner, as a result of the foregoing, embodiments of the present disclosure detect labels of a data catalog (e.g., data catalog 105) that are incorrectly assigned to data set fields, such as the data set fields of a data set stored in data lake 104.

Furthermore, the principles of the present disclosure improve the technology or technical field involving the enterprise data catalog. As discussed above, in order to comply with regulation rules, such as general data protection regulation (GDPR), enterprises (e.g., organizations, companies, etc.) need to have full knowledge of what type of data is stored by the enterprise, and depending on the type of data, appropriate actions need to be performed (e.g., masking data, preventing access to the data, etc.). Enterprises may store a significant amount of data, such as in a data lake (centralized repository that allows a user to store all structured and unstructured data at any scale), which requires enterprises to invest in enterprise data catalogs to provide them an index cataloging the data owned by the enterprise as well as metadata describing such data. Such metadata corresponds to a business glossary consisting of an ontology of business terms representing different types of concepts that may be relevant in the context of the enterprise. Predefined ontologies are available by different vendors and organizations in the form of industry models which are specific to a particular industry. A single industry model may contain thousands of business terms describing the stored data. When data sets are catalogued in the enterprise data catalog, they ideally need to have one of these business terms assigned to every field of the data set so that the business meaning of all these fields is documented and searchable. Since such an enterprise data catalog may contain the information about hundreds of thousands of data sets, where each data set may have hundreds of fields, the process of cataloging enterprise data may involve assigning the "label" or appropriate business term to millions of data set fields. For this reason, catalog vendors have an automated process to automatically assign the appropriate term to the stored data (data set fields) using various methods, such as applying predefined classifiers, analyzing the name of the assets (data set fields) and/or using a machine learning process to learn from assignments (assigning labels consisting of business terms to the stored data set fields) performed by the user. Unfortunately, such assignments of the labels (business terms) may be incorrect. For example, such labels may be incorrectly assigned to a data set field due to improperly training the machine learning process, confusing metadata (business terms), misunderstanding of the ontology, etc. For instance, metadata may be confusing where the name of a field seems to indicate a particular meaning, but instead, has a different meaning due to the fact that the data in that field belongs to a different domain. In another example, the ontology may be misunderstood since multiple business terms or labels sound similar but have different meanings and the automated process selects the wrong label. Unfortunately, there is not currently a means for identifying labels in the data catalog, such as an enterprise data catalog, that were improperly assigned to describe data fields of data sets.

Embodiments of the present disclosure improve such technology by representing the data of each data set field, such as those data set fields assigned to the same label, using a set of characteristics. A data set field, as used herein, refers to a set of values, which may be arranged in a table. Characteristics of the data set fields, as used herein, refer to the set of qualities or properties that applies to the data contained in the data set field. The data set fields are then clustered into clusters of data set fields based on the characteristics of the data of the data set fields. "Clustering," as used herein, refers to grouping data set fields that contain data with similar characteristics. In this manner, by grouping clusters of data set fields with similar characteristics, such clusters of data set fields are likely to share the same domain (area or sphere of knowledge). Those clusters of data set fields with a homogeneity (being assigned the same label) that exceeds a first threshold value and is below a second threshold value, where such threshold values may be user-designated, are identified. Homogeneity, as used herein, refers to the quality or state of the data set fields being assigned to the same label. In this manner, those clusters that are comprised of mainly one term being assigned to the data set fields of the cluster are identified. One or labels assigned to the data set fields of the identified clusters are identified as being suspect for incorrect assignments by having a frequency below a third threshold value (e.g., 3%), which may be user-designated. For example, if a cluster consists of two labels being assigned to the data set fields of the cluster, such as term T1 and term T2, and the percentage of data set fields being assigned by term T1 is 98% and the percentage of data set fields being assigned by term T2 is 2%, then it may be inferred that those data set fields assigned by term T2 are incorrect since the percentage of data set fields assigned by such a term is below a threshold value (e.g., 3%). The label(s) identified as being suspect for incorrect assignment are then presented to a user for review. In this manner, labels of a data catalog, such as an enterprise data catalog, that are incorrectly assigned to data set fields can now be detected. Furthermore, in this manner, there is an improvement in the technical field involving the enterprise data catalog.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for detecting labels incorrectly assigned to data set fields comprises representing data of each data set field using a set of characteristics. The method further comprises clustering the data set fields using the set of characteristics forming clusters of data set fields. The method additionally comprises identifying clusters of the formed clusters of data set fields with a homogeneity consisting of an assigned label that exceeds a first threshold value and is below a second threshold value. Furthermore, the method comprises identifying one or more labels assigned to data set fields in one or more clusters of the identified clusters with a frequency below a third threshold value as being suspect for incorrect assignments. Additionally, the method comprises presenting the identified one or more labels to a user for review.

Furthermore, in one embodiment of the present disclosure, the set of characteristics comprise a set of moments in the data set field and a histogram of the data set field.

Additionally, in one embodiment of the present disclosure, the set of characteristics comprises a list of data values in the data set field and a count for each data value in the list of data values.

Furthermore, in one embodiment of the present disclosure, the clustering comprises classifying the data set fields as numeric or categorical.

Additionally, in one embodiment of the present disclosure, where the data set fields are classified as numeric, the method further comprises calculating a distance matrix of the data set fields classified as numeric. The method additionally comprises running a clustering algorithm on data of the data set fields classified as numeric using the distance matrix as a metric to form the clusters of data set fields. Furthermore, the method comprises splitting a cluster into multiple smaller clusters in response to the cluster of the formed clusters of data set fields having a silhouette score mean below a threshold value and/or a negative silhouette score. Additionally, the method comprises running the clustering algorithm on data of data set fields of the smaller clusters in response to splitting the cluster into the smaller clusters to determine a second silhouette score mean and/or a second silhouette score. In addition, the method comprises completing the clustering of the data set fields classified as numeric in response to each cluster of the data set fields classified as numeric not having the silhouette score mean below the threshold value and/or the negative silhouette score.

Furthermore, in one embodiment of the present disclosure, where the data set fields are classified as categorical, the method additionally comprises using a set of moments as features for the clustering. The method further comprises scaling each of the set of moments. Furthermore, the method comprises calculating a distance between the data set fields classified as categorical using the scaled set of moments to create a distance matrix. Additionally, the method comprises running a clustering algorithm on data of the data set fields classified as categorical using the distance matrix as a metric to form the clusters of data set fields.

Additionally, in one embodiment of the present disclosure, the data set fields comprise labeled and unlabeled data, where a label of the labeled data is presented as a label for other unlabeled data in response to the label being with a threshold degree of similarity to a greatest number of other labels of the labeled data.

Other forms of the embodiments of the computer-implemented method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for detecting labels incorrectly assigned to data set fields, the method comprising:

representing data of each data set field using a set of characteristics that were extracted from data set fields assigned to a same label;

clustering the data set fields using the set of characteristics forming clusters of data set fields, wherein, for the data set fields classified as numeric, the clustering comprises:

calculating a first distance matrix of the data set fields classified as numeric;

running a first clustering algorithm on data of the data set fields classified as numeric using the first distance matrix as a metric to form the clusters of data set fields;

splitting a cluster into multiple smaller clusters in response to the cluster of the formed clusters of data set fields having a silhouette score mean below a threshold value;

running the first clustering algorithm on data of data set fields of the smaller clusters in response to splitting the cluster into the smaller clusters to determine a second silhouette score; and completing the clustering of the data set fields classified as numeric in response to each cluster of the data set fields classified as numeric not having the silhouette score mean below the threshold value;

identifying clusters of the formed clusters of data set fields with a homogeneity consisting of an assigned label that exceeds a first threshold value and is below a second threshold value;

identifying one or more labels assigned to data set fields in one or more clusters of the identified clusters with a frequency below a third threshold value as being suspect for incorrect assignments; and presenting the identified one or more labels to a user for review via electronic means.

2. The method as recited in claim 1, wherein the set of characteristics comprises a set of moments in the data set field and a histogram of the data set field.

3. The method as recited in claim 1, wherein the set of characteristics comprises a list of data values in the data set field and a count for each data value in the list of data values.

4. The method as recited in claim 1, wherein, for the data set fields classified as categorical, the clustering comprises:

using a set of moments as features for the clustering;

scaling each of the set of moments;

calculating a distance between the data set fields classified as categorical using the scaled set of moments to create a second distance matrix; and running a second clustering algorithm on data of the data set fields classified as categorical using the second distance matrix as a metric to form the clusters of data set fields.

5. The method as recited in claim 1, wherein the data set fields comprise labeled and unlabeled data, wherein a label of the labeled data is presented as a label for other unlabeled data in response to the label being with a threshold degree of similarity to a greatest number of other labels of the labeled data.

6. A computer program product for detecting labels incorrectly assigned to data set fields, the computer program product comprising one or more computer readable storage mediums having program code embodied therewith, the program code comprising programming instructions for:

representing data of each data set field using a set of characteristics that were extracted from data set fields assigned to a same label;

clustering the data set fields using the set of characteristics forming clusters of data set fields, wherein, for the data set fields classified as numeric, the clustering comprises:

calculating a first distance matrix of the data set fields classified as numeric;

running a first clustering algorithm on data of the data set fields classified as numeric using the first distance matrix as a metric to form the clusters of data set fields;

splitting a cluster into multiple smaller clusters in response to the cluster of the formed clusters of data set fields having a silhouette score mean below a threshold value;

running the first clustering algorithm on data of data set fields of the smaller clusters in response to splitting the cluster into the smaller clusters to determine a second silhouette score; and completing the clustering of the data set fields classified as numeric in response to each cluster of the data set fields classified as numeric not having the silhouette score mean below the threshold value;

identifying clusters of the formed clusters of data set fields with a homogeneity consisting of an assigned label that exceeds a first threshold value and is below a second threshold value;

identifying one or more labels assigned to data set fields in one or more clusters of the identified clusters with a frequency below a third threshold value as being suspect for incorrect assignments; and presenting the identified one or more labels to a user for review via electronic means.

7. The computer program product as recited in claim 6, wherein the set of characteristics comprises a set of moments in the data set field and a histogram of the data set field.

8. The computer program product as recited in claim 6, wherein the set of characteristics comprises a list of data values in the data set field and a count for each data value in the list of data values.

9. The computer program product as recited in claim 6, wherein, for the data set fields classified as categorical, the clustering comprises:

using a set of moments as features for the clustering;

scaling each of the set of moments;

calculating a distance between the data set fields classified as categorical using the scaled set of moments to create a second distance matrix; and running a second clustering algorithm on data of the data set fields classified as categorical using the second distance matrix as a metric to form the clusters of data set fields.

10. The computer program product as recited in claim 6, wherein the data set fields comprise labeled and unlabeled data, wherein a label of the labeled data is presented as a label for other unlabeled data in response to the label being with a threshold degree of similarity to a greatest number of other labels of the labeled data.

11. A system, comprising:

a memory for storing a computer program for detecting labels incorrectly assigned to data set fields; and a processor connected to the memory, wherein the processor is configured to execute program instructions of the computer program comprising:

representing data of each data set field using a set of characteristics that were extracted from data set fields assigned to a same label;

clustering the data set fields using the set of characteristics forming clusters of data set fields, wherein, for the data set fields classified as numeric, the clustering comprises:

calculating a first distance matrix of the data set fields classified as numeric;

running a first clustering algorithm on data of the data set fields classified as numeric using the first distance matrix as a metric to form the clusters of data set fields;

splitting a cluster into multiple smaller clusters in response to the cluster of the formed clusters of data set fields having a silhouette score mean below a threshold value;

running the first clustering algorithm on data of data set fields of the smaller clusters in response to splitting the cluster into the smaller clusters to determine a second silhouette score; and completing the clustering of the data set fields classified as numeric in response to each cluster of the data set fields classified as numeric not having the silhouette score mean below the threshold value;

identifying clusters of the formed clusters of data set fields with a homogeneity consisting of an assigned label that exceeds a first threshold value and is below a second threshold value;

identifying one or more labels assigned to data set fields in one or more clusters of the identified clusters with a frequency below a third threshold value as being suspect for incorrect assignments; and presenting the identified one or more labels to a user for review via electronic means.

12. The system as recited in claim 11, wherein the set of characteristics comprises a set of moments in the data set field and a histogram of the data set field.

13. The system as recited in claim 11, wherein the set of characteristics comprises a list of data values in the data set field and a count for each data value in the list of data values.

14. The system as recited in claim 11, wherein, for the data set fields classified as categorical, the clustering comprises:

using a set of moments as features for the clustering;

scaling each of the set of moments;

calculating a distance between the data set fields classified as categorical using the scaled set of moments to create a second distance matrix; and running a second clustering algorithm on data of the data set fields classified as categorical using the second distance matrix as a metric to form the clusters of data set fields.

* * * * *